United States Patent [19]

Adamson

[11] Patent Number: 4,461,405

[45] Date of Patent: Jul. 24, 1984

[54] APPARATUS FOR DISPENSING DRY POWDERED MATERIAL

[75] Inventor: Lee E. Adamson, Roscoe, Ill.

[73] Assignee: Taylor Freezer Company, Rockton, Ill.

[21] Appl. No.: 449,522

[22] Filed: Dec. 13, 1982

[51] Int. Cl.³ .............................................. B65G 65/44
[52] U.S. Cl. .................................... 222/201; 222/227; 222/231; 222/234; 366/108
[58] Field of Search ............... 222/160, 161, 196, 200, 222/201, 226, 227, 230–235, 410–413; 366/108, 118

[56] References Cited

U.S. PATENT DOCUMENTS

| | | | |
|---|---|---|---|
| 1,696,587 | 12/1928 | Yarwood | 222/201 X |
| 1,872,028 | 8/1932 | Collins | 222/227 X |
| 2,123,318 | 7/1938 | Taylor | 222/201 X |
| 2,753,089 | 7/1956 | Phillips | 222/227 |
| 2,794,577 | 6/1957 | Leeuwen | 222/227 |
| 3,013,701 | 12/1961 | Joschko | 222/227 |
| 3,081,505 | 3/1963 | Butzow | 222/196 X |
| 3,858,498 | 1/1975 | Swenson | 99/470 |
| 4,207,995 | 6/1980 | Neely | 222/231 |

Primary Examiner—Joseph J. Rolla
Assistant Examiner—Michael S. Huppert
Attorney, Agent, or Firm—Vernon J. Pillote

[57] ABSTRACT

An apparatus for dispensing dry powdered material including a hopper having a trough shaped bottom and a dispensing outlet at one end of the bottom wall, a feed auger for feeding material along the bottom and an agitator wheel mounted for rotation in an upright plane through the auger and meshing with the auger for rotation thereby. Reciprocating agitators are mounted in the hopper at opposite sides of the agitator wheel for movement along paths generally paralleling the auger and actuator members are provided on the wheel arranged to engage abutments on the agitator members to move the agitator members in one direction. Springs are provided on the agitator members to return the agitator members in the opposite direction until stops on the agitator members engage brackets on the hopper with an impact to jar and loosen material that may cling to the walls of the hopper.

12 Claims, 6 Drawing Figures

APPARATUS FOR DISPENSING DRY POWDERED MATERIAL

BACKGROUND OF THE INVENTION

The present invention relates to an apparatus for dispensing dry powdered materials and particularly for dispensing accurately metered quantities of dry powdered materials. The apparatus may, for example, be used to dispense metered quantities of dry powdered materials for mixing with liquid to produce a liquid mix in an ice cream freezer, or for producing a beverage in a beverage dispenser. Such powdered material dispensers commonly employ a hopper and a feed auger for feeding dry powdered material from the hopper and for dispensing it through the dispensing outlet in the hopper. Many of the dry powdered materials that are used in the preparation of liquid mixes for ice cream, beverages, and the like are hygroscopic and cohesive and tend to form material bridges in the hopper and across the feed auger. The material bridges interrupt the free flow of material to the feed auger and reduce the amount of material dispensed during each revolution of the auger with a consequent decrease in the charge delivered by the feed auger to the dispensing outlet. Further, material sometime remains in certain areas of the hopper for a long time and can deteriorate or lose its strength and/or flavor.

It has heretofore been proposed, for example as shown in U.S. Pat. Nos. 1,872,028; 2,753,089; 2,794,577; 3,013,701 and 4,207,995, to provide a rotatable agitator wheel in the hopper with teeth on the periphery of the wheel that mesh with the feed auger to rotate the wheel when the feed auger is rotated. While such an agitator wheel can agitate and loosen the material in the area in which the agitator wheel moves, the agitator wheel only extends tangent to the feed auger and does not agitate the material along the length of the auger. Further, there are some areas in the hopper, particularly the larger size hoppers used for storing a large amount of material, in which the material is not agitated and can remain for a long time.

SUMMARY OF THE INVENTION

It is an object of the present invention to provide an apparatus for dispensing dry powdered material having an improved arrangement for agitating and loosening material in the hopper during operation of the feed auger.

Accordingly, the present invention provides an apparatus for dispensing dry powdered material comprising a hopper having trough along its bottom and a dispensing outlet adjacent one end of the trough and a feed auger extending along the trough and supported for axial rotation on the hopper for feeding material to the outlet. An agitator wheel is rotatably mounted in the hopper in an upright plane through the axis of the auger and has means engaging the auger for rotating the wheel when the auger is rotated. The wheel has a set of actuator members angularly spaced apart in a circular pattern about the axis of the wheel and at least one reciprocating agitator slidably mounted on the hopper for lengthwise reciprocation along a path generally paralleling the auger. Stop means on the agitator and hopper are engageable to stop movement of the agitator in one direction and spring means yieldably urges the agitator in said one direction to a first position. Abutment means are provided on the agitator at a location to be engaged by the actuator members during the movement through a preselected arc of travel for moving the agitator in a direction opposite said one direction. The path of movement of the abutment means on the agitator extends generally tangent to the path of movement of the actuator members on the wheel and such that the abutment means disengages the actuator member at the end of the preselected arc of travel to allow a rapid return of the agitator to its first position with an impact engagement of the stop means on the agitator and hopper. The reciprocation of the agitator stirs and agitates the material in the hopper alongside the auger and the impact engagement of the agitator with the hopper effects a jarring or vibration of the hopper and material therein to loosen the material along the walls of the hopper.

These, together with other objects, features and advantages of this invention will be more readily understood by reference to the following detailed description when taken in connection with the accompanying drawings wherein:

FIG. 6 is a diagrammatic view of an apparatus for producing a liquid mix embodying the apparatus for dispensing dry powdered ingredients.

Figure 1:
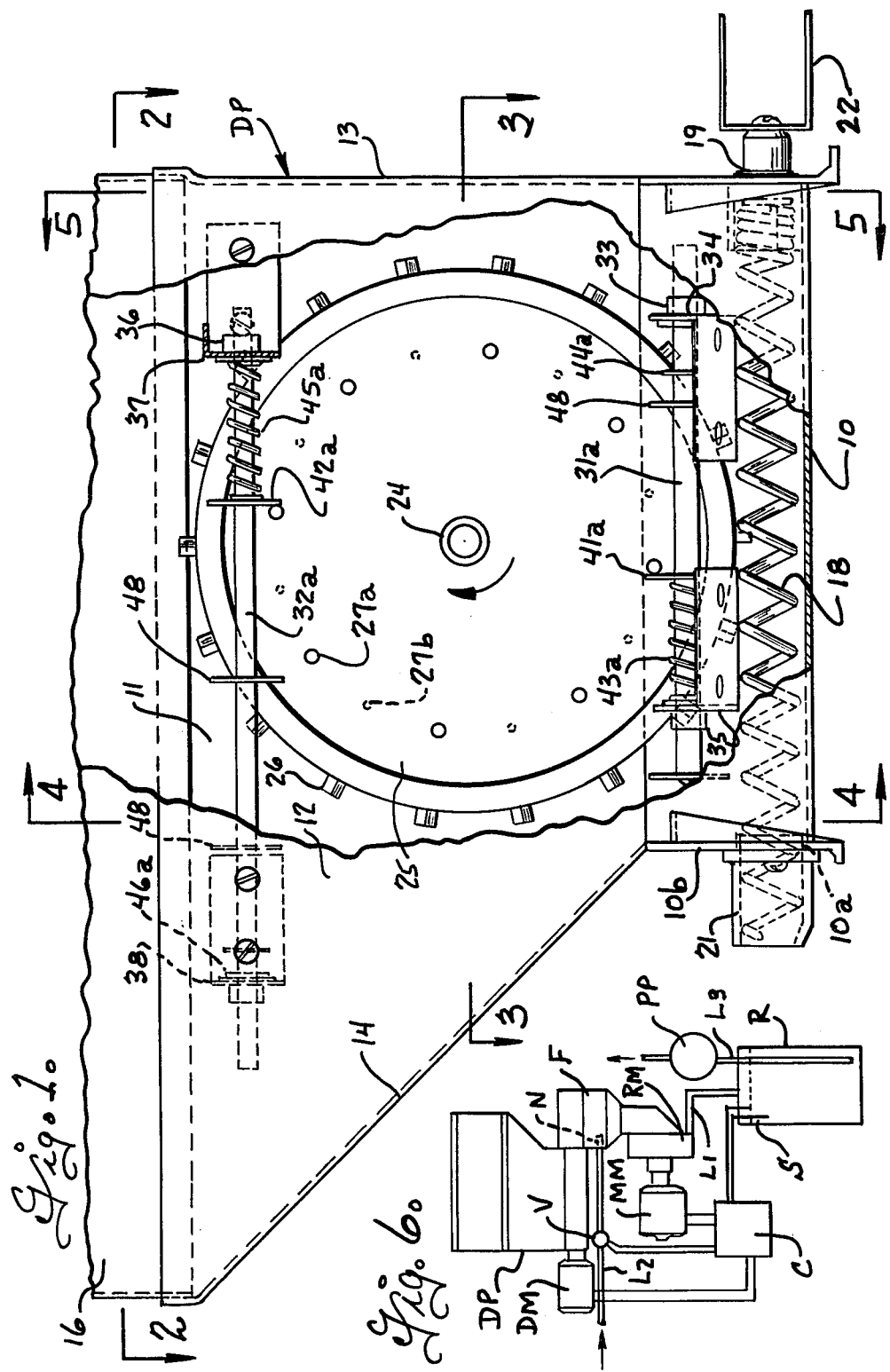
FIG. 1 is a fragmentary side elevational view of a dispensing apparatus embodying the present invention, with parts broken away and shown in section to illustrate details of construction.
Figure 2:
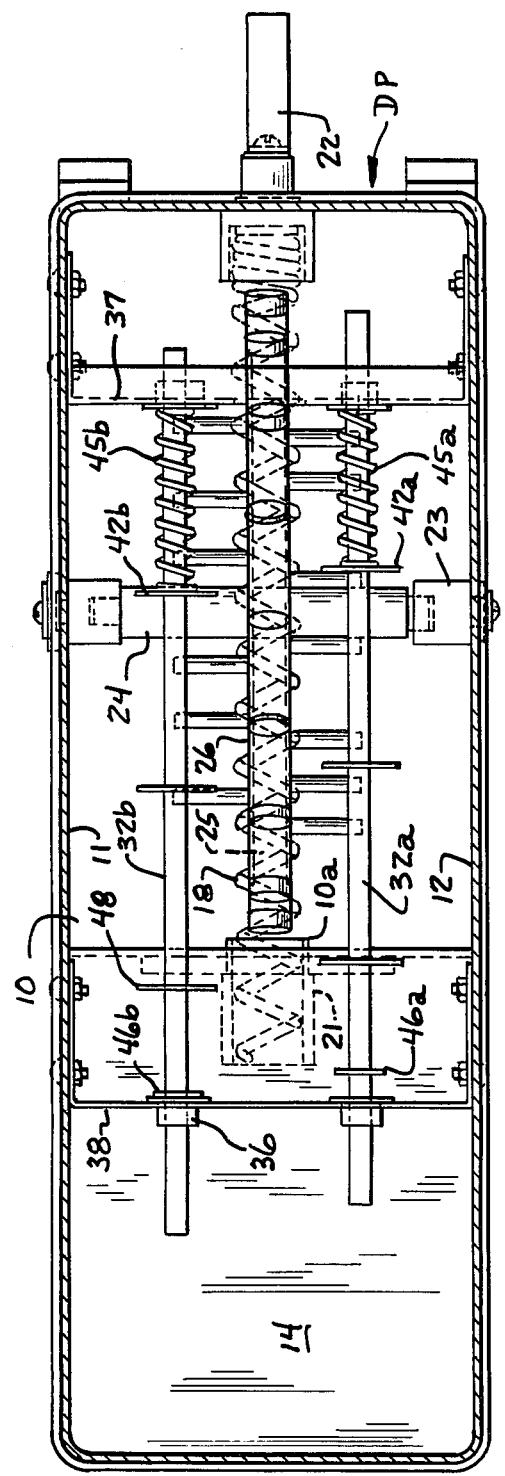
FIG. 2 is a horizontal sectional view taken on the plane 2—2 of FIG. 1.

The dispensing apparatus DP of the present invention is generally adapted for dispensing dry powdered ingredients and may, for example, be used in an apparatus for producing a liquid mix in a continuous type ice cream freezing machine as disclosed in U.S. Pat. No. 3,858,498, or in a beverage producing apparatus for use in a vending machine, as disclosed in U.S. Pat. No. 3,013,701.

The apparatus for dispensing dry powdered material in general includes a hopper having a trough shaped bottom wall 10, upstanding side walls 11 and 12 and end walls 13 and 14 extending between the side walls. Some applications of the dispensing apparatus require hoppers of different capacity and, in order to adapt the hoppers for different installations, an extension 16 is provided and arranged to be mounted on the upper ends of the side and end walls. As shown, the side and end walls have an offset lip portion at their upper end adapted to receive the lower end of a generally rectangular hopper extension 16 to support the same with the extension walls substantially coplanar with the upper ends of the respective side and end walls.

A dispensing outlet 10a is provided in the end wall 10b at one end of the trough shaped bottom wall. An auger 18, conveniently in the form of a helical wire, extends along the trough shaped bottom and is rotatably supported at one end in a bearing 19 on the end wall 13, and at its other end in a tubular nozzle 21 on the end 10b of the trough shaped bottom wall. The auger has a coupling 22 at its outer end adapted for connection to a drive motor of a type adapted to rotate the auger at a controlled speed. The hopper and its extension can be formed of metal or plastic as desired, it being understood that for dispensing powdered material for use in preparing foods, that the metal or plastic should be of a type approved for use in contact with foods.

An agitator wheel 25 is provided with laterally extending trunnions 24 and is rotatably supported as by bearings 23 on the side walls 11 and 12 of the hopper, for rotation in a generally upright plane through the axis of the feed auger. The wheel may, for example, be molded of a suitable plastic and has teeth 26 on its outer periphery arranged to mesh with auger 18 to rotate the wheel in response to rotation of the auger. A set of actuator members 27a, 27b are provided at opposite sides of the wheel and extend laterally thereof. The actuator members in each set are angularly spaced apart in a circular pattern about the axis of the wheel and, for reasons pointed out more fully hereinafter, the actuator members 27a at one side of the wheel are preferably angularly offset from the actuator members 27b at the other side of the wheel.

Figure 4:
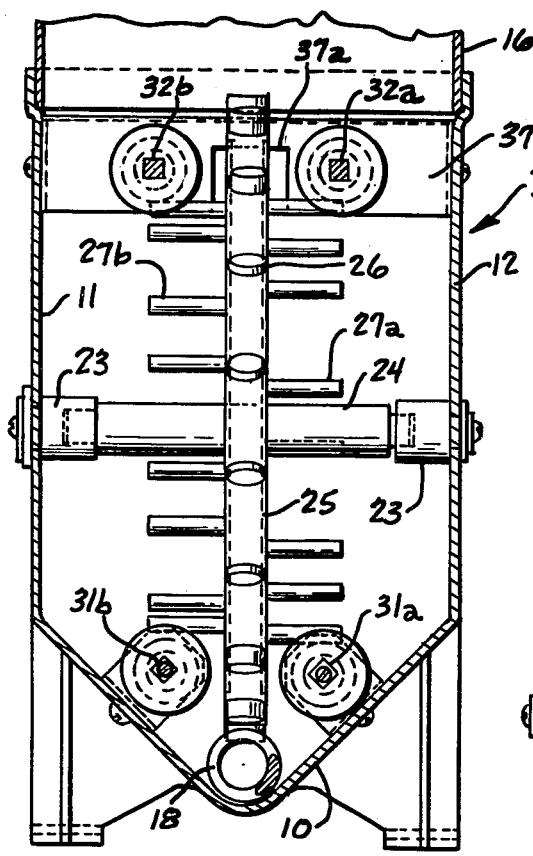
FIG. 4 is a transverse vertical sectional view taken on the plane 4—4 of FIG. 1.
Figure 5:
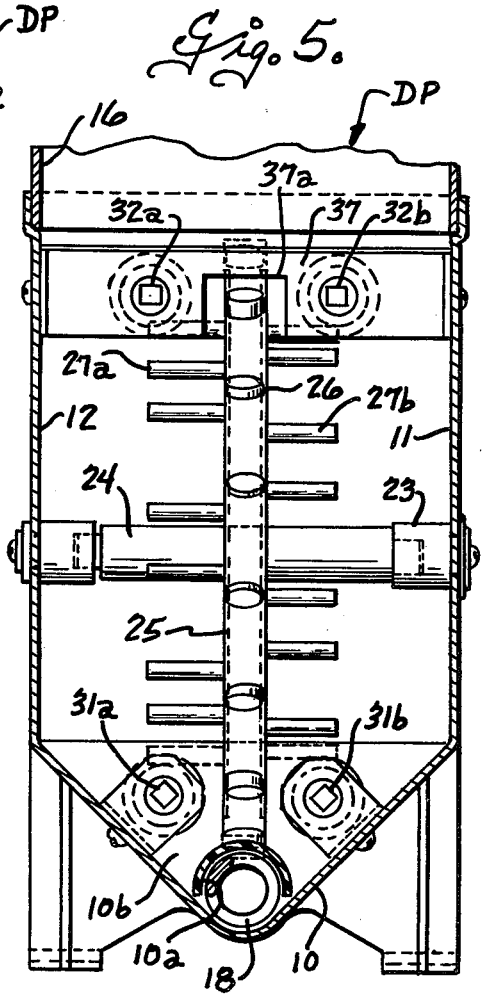
FIG. 5 is a transverse vertical sectional view taken on the plane 5—5 of FIG. 4.

The actuator members 27a, 27b function to agitate and stir the material at opposite sides of the wheel as the agitator wheel rotates. However, there are substantial areas of the hopper that are not swept by the wheel 25 and actuator members 27a, 27b. In accordance with the present invention, reciprocating agitators are provided in the hopper and arranged for operation by the wheel 25 to both agitate the powdered material in the hopper in areas not covered by the wheel, and to also apply a periodic impact or jarring force on the hopper to loosen material which tends to cling to the walls of the hopper. In the preferred embodiment illustrated, lower and upper reciprocating agitators 31a, 32a, and 31b, 32b are provided at opposite sides of the wheel 25. The lower agitators 31a and 31b are slidably supported in bushings 33 on brackets 34 and 35 attached to the downwardly converging walls of the trough shaped bottom 10, for lengthwise reciprocation along a path generally paralleling the auger adjacent the lower portion of the wheel 25. The upper reciprocating agitators 32a are slidably supported in bushings 36 on brackets 37, 38 attached to opposite side walls of the hopper, for lengthwise reciprocation along paths generally paralleling the auger adjacent the upper portion of the wheel 25. The upper brackets 37, 38 preferably extend between the opposite side walls of the hopper and the bracket 37 is notched intermediate the side walls as shown at 37a in FIGS. 4 and 5, so as to not interfere with rotation of the wheel. In the embodiment shown, the spacing between the end walls 13 and 14 adjacent the upper portion of the wheel is substantially greater than adjacent the lower portion of the wheel and the upper reciprocating agitators are made correspondingly longer than the lower agitators.

Figure 3:
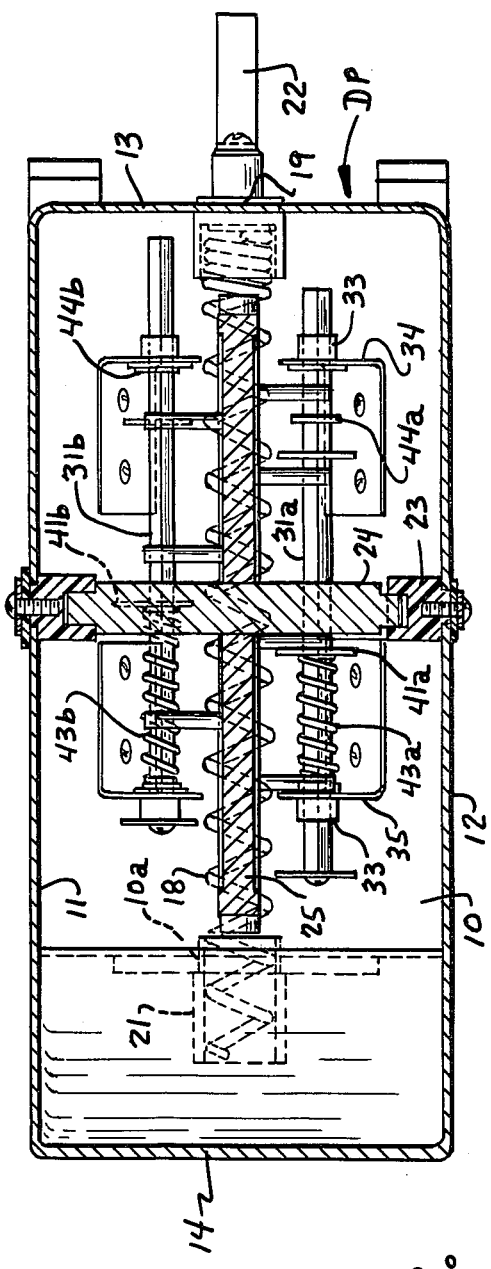
FIG. 3 is a horizontal sectional view taken on the plane 3—3 of FIG. 1.

When the auger 18 is rotated in a direction to feed material to the outlet 10a, it rotates the wheel 25 in the direction indicated by the arrow in FIG. 1. Abutments 41a, 41b (FIG. 3) are provided on the lower reciprocating agitators 31a and 31b respectively at a location to be engaged by the actuator members 27a, 27b as they move through a preselected arc in the lower portion of their path of travel, for moving the respective reciprocating agitator in a direction to the left as viewed in FIG. 1. Similarly, abutments 42a and 42b (FIG. 3) are provided on the upper reciprocating agitators 32a, 32b respectively, at locations to be engaged by the actuator members 27a, 27b during their movement through a preselected arc in the upper portion of their path of travel, for moving the upper reciprocating agitator members in a direction to the right as viewed in FIG. 1. Springs 43a, 43b are provided on the reciprocating agitators 31a and 31b respectively between the abutments 41a, 41b and the adjacent mounting bracket 35, to resiliently urge the reciprocating agitators in a direction opposite the direction of movement by the wheel. Stops 44a, 44b are provided on the reciprocating actuators 31a and 31b respectively, at locations to engage the lower bracket 34, to stop movement of the reciprocating agitators in the direction of movement by the springs 43a, 43b, when the agitator members reach a preselected position. Similarly, springs 45a, 45b are provided between the bracket 37 and the abutments 42a, 42b on the upper reciprocating agitators 32a, 32b respectively, for urging the upper agitators in a direction opposite the direction of movement by the wheel, and stops 46a, 46b are provided on the upper reciprocating agitators at locations to engage the bracket 38 to limit movement of the reciprocating agitators in the direction that they are urged by the springs, when the upper agitators reach a preselected position. The path of movement of the abutments on the several reciprocating agitators extends tangent to the path of movement of the actuator members on the wheel so that the actuator members at each side of the wheels sequentially engage the abutments on the reciprocating agitators on that side of the wheel and then disengage the abutments at the end of a predetermined arc of travel. When the abutments disengage the actuator member on the wheel, the spring rapidly returns the reciprocating agitator until the stop on the agitator engages the mounting bracket with an impact. This tends to jar or vibrate the walls of the hopper and tends to loosen powdered material that may cling to the hopper walls. The stops and abutment members can conveniently be in the form of transversely enlarged discs or the like which produce an agitating action as the reciprocating agitators are reciprocated, and additional agitator members such as indicated at 48 can be provided at spaced locations along the several reciprocating agitators to enhance the agitating action. Thus, the rotating wheel actuates both the upper and lower reciprocating agitators a plurality of times during each rotation of the wheel. Preferably, the actuating members 27a at one side of the wheel are angularly offset from the actuating members 27b at the other side of the wheels so that the reciprocation of the several agitators is staggered. This not only reduces the peak drive loads on the wheel 25 and auger 18 but also provides more uniform agitation and jarring or vibration of the hopper.

In FIG. 6, the dispensing apparatus is diagrammatically illustrated embodied in an apparatus for producing a liquid mix for a continuous type ice cream machine. As shown in FIG. 6, the dispensing apparatus DP has a drive motor DM arranged to drive the auger at a controlled speed to feed measured quantities of dry powdered material into a funnel F. The funnel also has a liquid inlet nozzle N, and the powdered material and liquid pass from the funnel to the inlet of a rotary mixer RM driven by a motor MM, and the liquid mix from the mixer is delivered through a line $L_1$ to reservoir R. The dispensing drive motor DM is of a type which will drive the dispensing apparatus DP at a controlled speed to deliver powdered material at a controlled rate into the funnel when the drive motor is energized, and the liquid supply to the nozzle is controlled, as by appropriate selection of the size of the nozzle and the pressure on the liquid in the supply line $L_2$, to deliver liquid at a controlled rate to the funnel, when the valve V is opened. A control C including liquid level sensors S is provided to control operation of the dispensing drive motor DM, the valve V and the mixer motor MM to simultaneously feed powdered material and water at controlled rates to the mixer for intervals as required to maintain a preselected level in the reservoir. Liquid mix for the reservoir is delivered through a line $L_3$ either by gravity or by a product pump PP into continuous type ice cream freezer (not shown).

From the foregoing it is felt that the construction and operation of the apparatus for dispensing dry powdered materials will be readily understood. The agitator wheel 25 is rotated during rotation of the auger and the actuator members 27a, 27b on the wheel engage abutments on the several reciprocating agitators to move the same in one direction against the bias of the respective springs. The reciprocating agitators are supported for reciprocation along paths generally paralleling the auger and tangent to the path of movement of the actuator members on the wheel, so that each actuator member engages an abutment on the reciprocating agitator during only a portion of its arc of travel and then moves out of engagement with the abutment to allow the spring to rapidly return the agitator members to a position in which the stop on the agitator members engages a mounting bracket on the hopper. The actuator members on opposite sides of the wheel produce an agitating and stirring action in the regions traversed by the agitator members and the reciprocating agitators are disposed at opposite sides of the wheel and extend beyond the path of travel of the wheel to increase the area which is agitated and stirred. Further, the lower agitators 31a, 31b extend alongside the feed auger 18 to agitate and stir material along the length of the feed auger. In addition, the reciprocating agitator members are rapidly returned to their stop position and produce an impact or jarring of the hopper, to loosen the material which tends to cling to the walls of the hopper. This inhibits bridging of material in the hopper and not only provides more uniform flow of material to the feed auger for more accurate dispensing, but also reduces the likelihood of material flowing only through one portion of the hopper while material in the other portions remains dormant.

The embodiments of the invention in which an exclusive property or privilege is claimed are defined as follows:

1. An apparatus for dispensing dry powdered material comprising, a hopper having a trough along its bottom and a dispensing outlet adjacent one end of the trough, feed auger means extending along the trough and supported for axial rotation on the hopper for feeding material to said outlet, an agitator wheel rotatably mounted on the hopper in an upright plane through the axis of the auger and having means engaging the auger for rotating the wheel in one direction when the auger is rotated, the wheel having a set of actuator members angularly spaced apart in a circular pattern about the axis of the wheel, at least one reciprocating agitator slidably mounted on the hopper for lengthwise reciprocation along a path generally paralleling the auger, stop means on the reciprocating agitator and hopper engageable to stop movement of the reciprocating agitator in one direction at a first position, spring means resiliently urging the reciprocating agitator in said one direction to said first position, abutment means on the reciprocating agitator at a location to be engaged by the actuator members during their movement through a preselected arc of travel for moving the reciprocating agitators in a direction opposite said one direction, the path of movement of the abutment means on the reciprocating agitator extending generally tangent to the path of movement of the actuator members on the wheel and such that the abutment means disengages the actuator member at the end of said preselected arc of travel to allow rapid return of the reciprocating agitator to its first position with an impact engagement of the stop means on the agitator and hopper.

2. An apparatus for dispensing dry powdered material according to claim 1 including a plurality of agitator members extending laterally from the reciprocating agitator at spaced locations therealong for agitating product in the hopper as the agitator is reciprocated.

3. An apparatus for dispensing dry powdered material according to claim 1 wherein at least two reciprocating agitators are provided, one at each side of the wheel.

4. An apparatus for dispensing dry powdered material according to claim 1 wherein a reciprocating agitator is provided at each side of the wheel, and two sets of actuator members are provided, one at each side of the wheel for actuating a respective one of the reciprocating agitators.

5. An apparatus for dispensing dry powdered material according to claim 4 wherein the actuator members of the set at one side of the wheel are arranged to actuate the associated reciprocating agitator at angular positions of the wheel different from those at which actuator members of the set at the other side of the wheel actuate the associated reciprocating agitators.

6. An apparatus for dispensing dry powdered material according to claim 1 wherein a reciprocating agitator is mounted on each side of the wheel adjacent the lower side of the wheel and a reciprocating agitator is mounted on each side of the wheel adjacent the top of the wheel, and two sets of actuator members are provided, one at each side of the wheel for actuating the reciprocating agitators on the respective side of the wheel.

7. An apparatus for dispensing dry powdered material according to claim 6 wherein the actuator members of the set at one side of the wheel are arranged to actuate the associated reciprocating agitators at angular positions of the wheel different from those at which the actuator members at the other side of the wheel actuate the associated reciprocating agitators.

8. An apparatus for dispensing dry powdered material comprising, a hopper having a trough along its bottom and a dispensing outlet adjacent one end of the trough, feed auger means extending along the trough and supported for axial rotation on the hopper for feeding product to said outlet, an agitator wheel rotatably mounted in the hopper in an upright plane through the axis of the auger and having circumferentially spaced teeth meshing with the auger for rotating the wheel in one direction when the auger is rotated, the wheel having a set of actuator members at each side angularly spaced apart in a circular pattern about the axis of the wheel, at least one reciprocating agitator mounted on the hopper at each side of the wheel for lengthwise reciprocation along paths generally paralleling the auger, stop means on the reciprocating agitators and hopper engageable to stop movement of the reciprocating agitators in one direction at a first position thereof, spring means resiliently urging the reciprocating agitators in said one direction to their first position, abutment means on the reciprocating agitators at a location to be engaged by the actuator members on the same side of the wheel during movement of each actuator member through a preselected arc of travel for moving the reciprocating agitators in a direction opposite said one direction, the paths of movement of the abutment means on each reciprocating agitator extending generally tangent to the path of movement of the actuator member on the same side of the wheel and such that the abutment means disengages each of the associated actuator means at the end of a predetermined arc of travel to allow rapid return of the reciprocating agitators to its first position with an impact engagement of the stop means on the agitator and hopper.

9. An apparatus for dispensing dry powdered material according to claim 8 wherein the reciprocating agitators are located adjacent the lower portion of the wheel.

10. An apparatus for dispensing dry powdered material according to claim 8 wherein lower and upper reciprocating agitators are mounted at each side of the wheel.

11. An apparatus for dispensing dry powdered material according to claim 10 including a plurality of agitator members extending laterally of each reciprocating agitator at spaced locations therealong.

12. An apparatus for dispensing dry powdered material according to claim 8 wherein the set of actuator members at one side of the wheel are angularly offset from the actuator members at the other side of the wheel to actuate the reciprocating agitators at opposite sides of the wheel at relatively different angular positions of the wheel.

* * * * *